United States Patent [19] [11] 4,104,488
Weir et al. [45] Aug. 1, 1978

[54] SUBSCRIBER LINE CIRCUIT

[75] Inventors: Donald A. Weir, Goff's Oak, Nr. Cheshunt; Anthony W. Sweet, Saffron Walden, both of England

[73] Assignee: International Standard Electric Corporation, New York, N.Y.

[21] Appl. No.: 798,415

[22] Filed: May 19, 1977

[51] Int. Cl.² .......................... H04B 3/46; H04M 3/02
[52] U.S. Cl. ............................ 179/18 FA; 179/18 HB; 179/84 A
[58] Field of Search ........... 179/18 F, 18 FA, 18 HB, 179/84 R, 84 A, 81 R

[56] References Cited
U.S. PATENT DOCUMENTS

| 3,889,069 | 6/1975 | Ault .................................... 179/18 F |
| 3,903,375 | 9/1975 | DeWit ............................... 179/18 HB |
| 4,020,294 | 4/1977 | Kitajewski et al. ............. 179/18 FA |
| 4,022,980 | 5/1977 | Kitajewski et al. ............... 179/84 A |

Primary Examiner—Thomas A. Robinson
Attorney, Agent, or Firm—John T. O'Halloran; Jeffrey P. Morris

[57] ABSTRACT

Telephone subscriber line circuits and an all-electronic telephone exchange are described wherein Hall effect devices are incorporated to detect line looping, dialing and ring-trip.

9 Claims, 3 Drawing Figures

SUBSCRIBER LINE CIRCUIT

BACKGROUND OF THE INVENTION

This invention relates to telephone subscriber's line circuits such as used in automatic telephone exchanges, and especially to arrangements for the application of ringing to a wanted line, and for responding to the line's looped or unlooped condition. A response to the looped or unlooped condition of the line is needed when a caller initiates a call, when a caller dials and sends break impulses, when a wanted subscriber replies, and when a subscriber hangs up.

SUMMARY OF THE INVENTION

According to the present invention there is provided a line circuit arrangement, such as used in an automatic telephone exchange, in which the direct current feed from the exchange is via transformer windings each connected between one terminal of the direct current supply and one of the line wires, in which the transformer has an additional winding via which an alternating current such as ringing current may be applied when required to the line wires, in which a Hall effect device is used for detecting when direct current flows in the line wires, e.g. due to the line becoming looped, and in which the magnetic circuit needed for the Hall effect device also carries the aforesaid transformer windings.

Preferred embodiments of the invention will now be described with reference to the accompanying drawings, wherein:

DESCRIPTION OF THE PREFERRED EMBODIMENTS

In the line circuits described herein the line condition detection uses a Hall effect device in the manner described with reference to British Applications Nos. 7158/75 (R. Kitajewski, et al. 10-4) and 12370/75 (R. Kitajewski, et al. 13-7-2, also U.S. Pat. No. 4,022,980 issued May 10, 1977 which description is incorporated herein by reference, and which applications are assigned to the same assignee as is the present invention. Such a device includes a Hall element which is a flat plate formed, for instance, by a thin film of a suitable semiconductor material or a single crystal structure which is located in a magnetic circuit so that the magnetic field is at right angles to the plane of the element. Connections are provided to the element via which a control current flows between terminals on two parallel sides of the element, and output terminals are provided on the other two sides of the element. Variations in the magnetic field and/or in the control current produce a potential between the output terminals whose value and sense depends on the field and the current. Thus if the field or the current is constant and the current or the field varies, the output potential is representative of the one which varies. In the circuits of this application the connections of the Hall device, whose magnetic circuit is formed by the magnetic circuit of the line transformer T1, are shown in a simplified manner to avoid unnecessarily complicating the drawings.

The transformer windings are provided mainly for use as battery feed impedances, but they also permit coupling to the line for test access and for ringing. The arrangement, with the line blocking capacitors C1 and C2, is fundamentally a Stone bridge. The control current of the Hall element is maintained constant, and the device output is therefore responsive to variations in the magnetic field and therefore in the line current.

Figure 1:
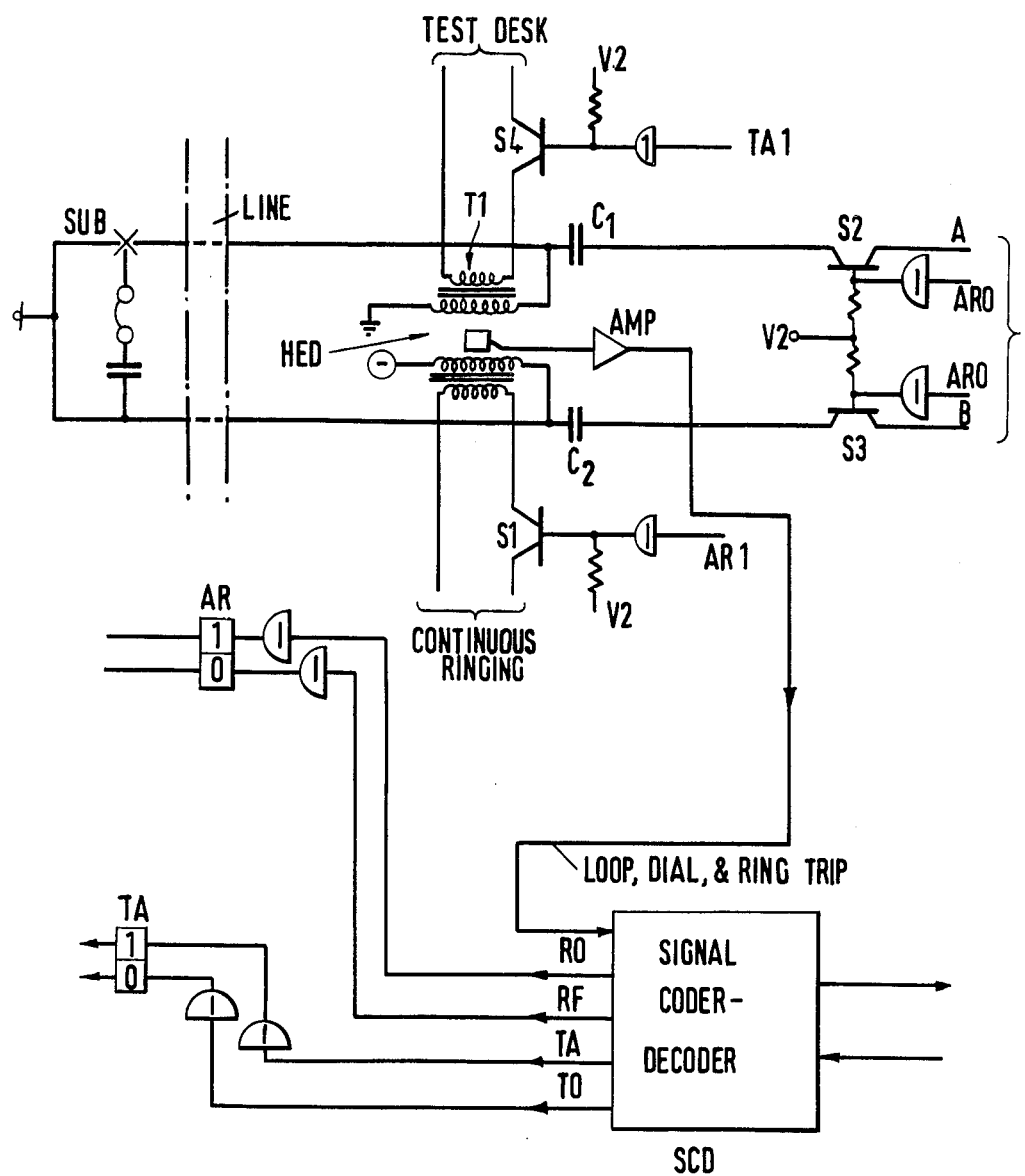
FIG. 1 illustrates a line circuit embodying the present invention for a single party line with ringing and test access.

When the subscriber whose line circuit is shown in FIG. 1 is to be rung, the signal coder/decoder unit SCD is instructed by the exchange control equipment (not shown) to energise its Ring-On output RO, which sets the ringing flip-flop AR to its 1 state, which at AR1 switches on a switch transistor S1 to apply low voltage ringing current to a winding of T1, and hence to line to ring the subscriber's bell. In addition, as the O output of AR is no longer energised, switches S2 and S3 break the A and B wires towards the calling line. At the end of the burst of initial ringing, SCD via its ring-off output RF sets AR to O to cut S1 off and also to switch S2 and S3 on again.

The ringing cadence is applied from the control equipment so that on each ring-on signal AR is set to 1 to switch S1 on to connect continuous ringing — 10 volts AC at 25 Hz — to the transformer (and thus to line) and to switch S2 and S3 off.

The above condition persists until the called subscriber replies, when the output of the Hall effect device HED detects that the line is looped, and via its output, amplified by an amplifier AMP, passes an indication to this effect to the coder/decoder SCD. This latter forwards the appropriate information to the control equipment that the called party has replied. This causes ringing to be cut off by the resetting of AR, and the conversation can now take place.

When the subscriber hangs up the device HED detects the absence of loop, so the unit SCD causes a clear signal to be sent to the central processor.

Detection of the loop when the subscriber initiates a call causes response of the Hall device HED in the same way as described above, with the result that SCD "tells" the central equipment that a call has been initiated. Response to unloopings and reloopings due to dialled break impulses occurs as described, again with suitable information being sent to the central equipment.

Test access is generally similar to ringing application, except that the test access signal usually persists for a much longer period than does a ringing burst, to enable the test desk to get access to the line for test purposes. The test access signal on reception by SCD is detected, so SCD energises its test access on output TA, which sets flip-flop TA to its 1 state to turn on the switch S4, which connects the test desk to another winding of the transformer T1. This AC connection to the line wires enables tests to be made of the line impedance, using an AC bridge.

It is noted that the circuit shown does not provide a DC connection to the line, so that localisation of an insulation fault is not possible using this circuit. When such a connection is needed it will be provided by other means, e.g. by a connection at the main distribution frame.

Figure 2:
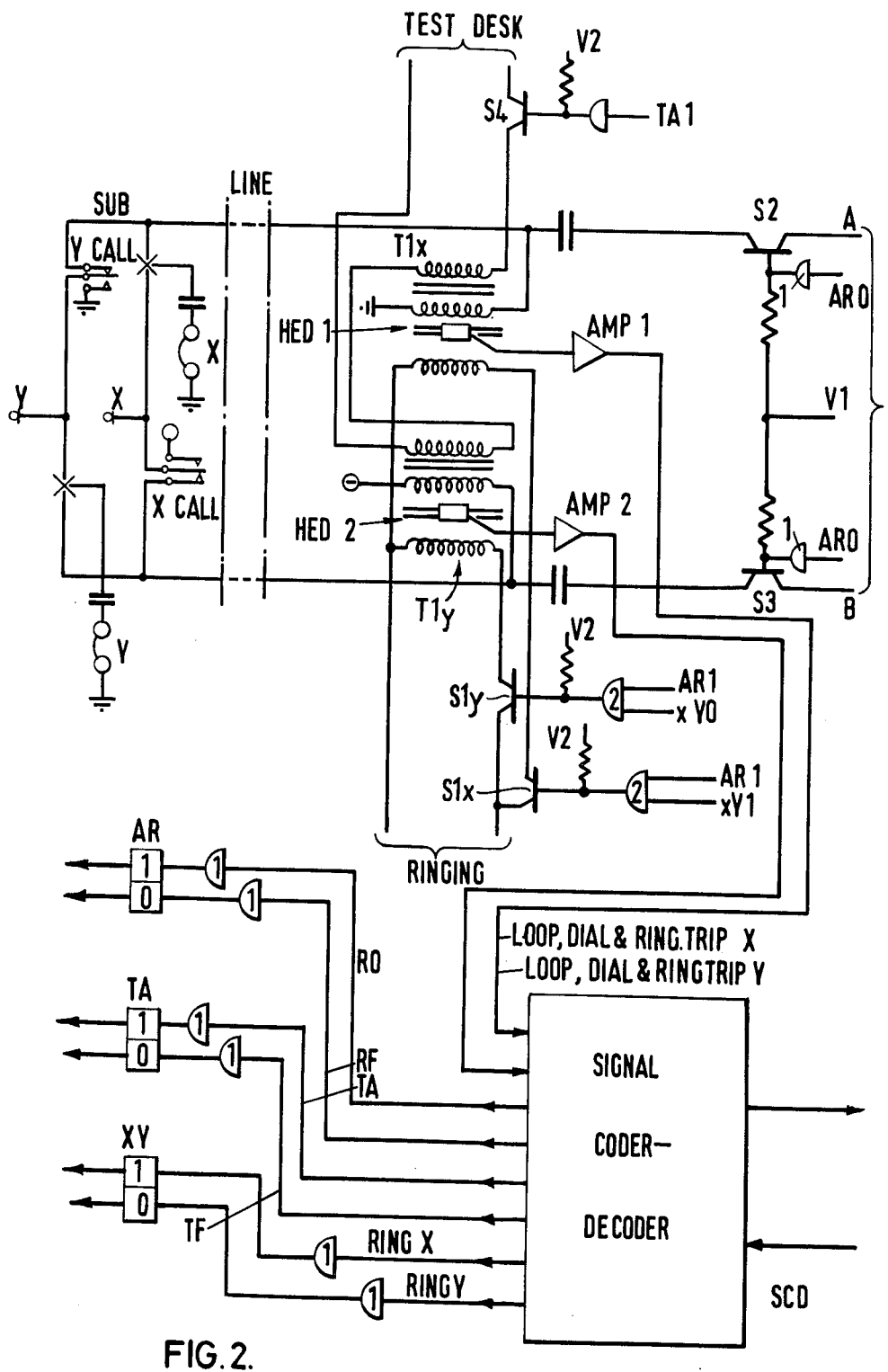
FIG. 2 illustrates a line circuit embodying the present invention for a two party line, also with ringing and test access.

The circuit of FIG. 2 is based on that of FIG. 1, with such alterations as are needed to provide for two parties, one connected to each leg of the line. Note that in this circuit the identification of the X-party depends on battery calling. Another possibility where the uppermost contact of the X call key is grounded is for the central windings of transformer T1x and T1y to go to +25 volts and −25 volts respectively, which also gives an overall line feed of 50 V.

To deal with two parties, each connected to one leg of the loop, the single transformer T1, FIG. 1, is replaced by the two transformers T1x and T1y already mentioned. Each transformer has its own Hall device, HED1 and HED2, so that the calling party can be discriminated. When a party is to be rung a signal from the unit SCD which indicates X or Y party sets the XY flip-flop to its state 1 or 0 respectively, dependent on whether party X or party Y is wanted. When the ring-on signal sets AR to 1, ringing is applied to the X or Y leg of the loop, dependent on the condition of XY. Assuming that the X party is wanted, ringing is applied to T1x via S1x, set by the gate connected to its base, which provides ringing on the A leg to operate the X bell to earth. When the X-party off-hooks, line current flows in T1x, and the device HED1 responds to indicate that X has looped the line. This generates a signal via SCD to "tell" the central equipment that ring trip has occurred. In response the central equipment, via SCD, resets AR to cut off the ringing. Conversation can now take place.

If the calling party is the X party, XY is set to its O state, which operates switch Sly to connect ringing via T1y to the B leg to ring the Y party's bell. Subsequent operation is as described for the X party.

When the X party calls, the party is identified by the call key or buttons which connects local battery to the A leg to generate a signal in the Hall device HED1 which indicates that X and not Y is calling. If Y calls the B leg is earthed which operates HED2. In either case the central equipment is advised as to which party is calling. Note that, as mentioned, the X party calling could be effected by grounding the line if a +25 V., −25 V., feeding arrangement for the lines is used.

Test access is via two windings in series, one on T1X and one on T1y, so connected that access to the line is in a balanced mode via both transformers. This gives conditions effectively the same as for the single party call. As before, access is effected by setting TA to its 1 state to close S4 to connect the test desk so that it can make AC tests.

Figure 3:
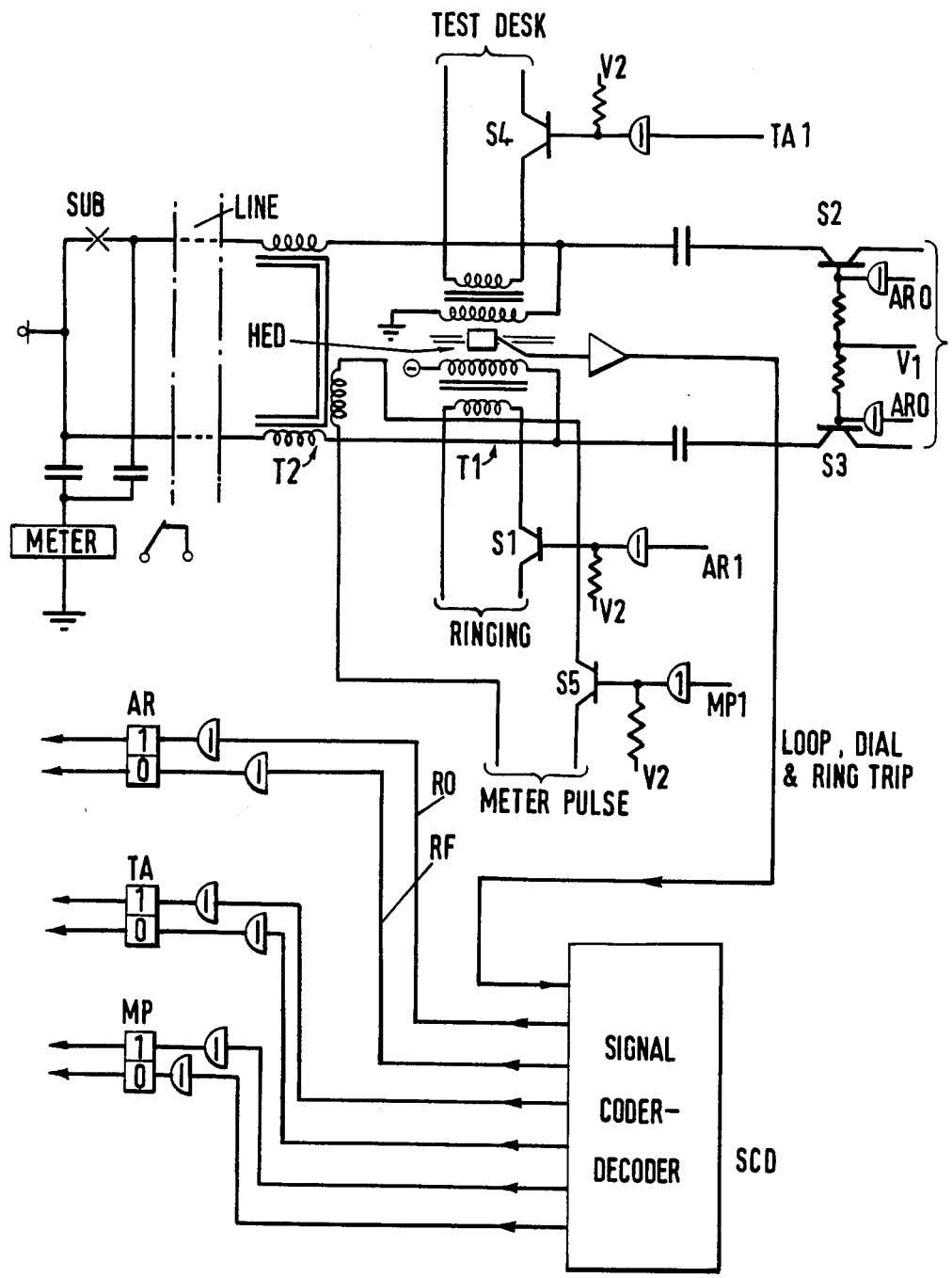
FIG. 3 illustrates a line circuit embodying the present invention which is similar to the line circuit described with reference to FIG. 1, but with provision for the supply of meter pulses.

FIG. 3 shows how, in a system generally similar to FIG. 1, a subscriber's meter can be operated over the phantom. The main difference from FIG. 1 is the addition of transformer T2, with one secondary in each line wire, and the meter pulse circuit which is controlled by a transistor S5 when the meter pulse flip-flop MP is at 1. MP is switched on by a meter pulse via SCD and is switched off when the meter pulse ends. This causes a meter pulse, e.g. 5 volts 50 Hz, to be applied to the line phantom-wise to operate the meter at the subscriber's premises.

Multi-party lines can be provided but are not shown since multi-party merely extends the two party techniques. Thus two groups of subscribers each ringing to earth are fed from first or second transformers, the first transformer being equivalent to T1x (FIG. 2) but with n/2 feed windings from the ringing supply to feed whatever number of parties is connected to the A leg.

The second transformer is similar except that it feeds the parties on the B leg. In this case the bells are each tuned to respond only to their own frequencies. Alternatively the cadences of the ringing may provide the distinctive call feature, in which case only two transformers as in FIG. 2 are needed. In these cases identification is not provided for, so a single Hall device is used to detect when the line is looped. As before the switches which correspond to S2 and S3 must be off when ringing is applied.

We claim:
1. A line circuit comprising:
   direct current feed means via transformer windings of a line transformer, each of said windings being connected between a direct current supply and one of a pair of line wires coupled thereto;
   an additional winding for said transformer via which an alternating current such as ringing current may be applied when required to said line wires;
   a Hall effect device for detecting when direct current flows in said line wires, and
   magnetic circuit means coupled to said Hall effect device and including said transformer windings.

2. A line circuit as claimed in claim 1, wherein the connection from said additional winding to a source of alternating current extends via the collector-emitter path of a normally cut-off transistor, and wherein control signals are applied to the base of said transistor to enable alternating current to be applied to the additional transformer winding.

3. A line circuit as claimed in claim 2, further including:
   telephone switching equipment having wires extending from the line circuit to said switching equipment each of said wires being coupled to the emitter-collector path of a normally conductive transistor, and wherein said normally conductive transistors are biassed OFF by signals applied to the bases thereof when alternating current is applied via said additional transformer winding.

4. A line circuit as claimed in claim 2 in which said transformer includes a fourth winding via which a connection is coupled to form a test connection to the line circuit, wherein said connection extends via the emitter-collector path of a further normally non-conductive transistor, and wherein when a test connection is established to the line circuit said further transistor is rendered conductive by an electrical signal applied to the base thereof.

5. A line circuit as claimed in claim 1, in which on the line side of said transformer there is inserted a second transformer having two windings each in series with one of the line wires and a third winding;
   a meter pulse source coupled to said third winding via the emitter-collector path of a third normally non-conductive transistor; and
   means for applying meter pulses for the operation of a meter to said meter at a subscriber location including means for rendering said third normally non-conductive transistor conductive by the application of a signal to the base of said third transistor for each meter pulse to be transmitted.

6. A line circuit as claimed in claim 1, further including a party-line circuit including two of said Hall effect devices each being coupled to a different one of two transformers, in which the direct current feed for one line wire is via a winding on the other of said transformers.

7. In an automatic telephone exchange serving two subscribers connected in a party line manner a line circuit comprising:
- direct current supply means having one terminal thereof connected to one wire of the line via a winding on a first transformer and the other terminal of the direct current supply connected to the other wire of the line via a winding on a second transformer;
- an additional winding on each of said transformers via which an alternating current may be coupled when required to its one of the line wires;
- two Hall effect devices each of which being associated with one only of the line wires for detecting when direct current flows in its one of the line wires with which it is associated; and
- magnetic circuit means for each Hall effect device of each of said line wires coupled to said transformer windings and including said transformer windings for each of said line wires.

8. A line circuit in accordance with claim 7 wherein said alternating current is a ringing current.

9. A line circuit in accordance with claim 7 wherein the direct current detected by each of said Hall effect devices is generated by the line wire associated with the detecting Hall effect device answering a line looped condition.

* * * * *